United States Patent

Cushman et al.

[15] 3,647,971

[45] Mar. 7, 1972

[54] AUTOMATIC REPORTING MONITORING AND CONTROL SYSTEM

[72] Inventors: Edward J. Cushman, Irvington, N.Y.; Jasper Clark, East Lynn, W. Va.

[73] Assignee: Watch-Tel 24, Inc., Flushing, N.Y.

[22] Filed: Mar. 20, 1970

[21] Appl. No.: 21,335

[52] U.S. Cl. ....................179/2 A, 340/171 A

[51] Int. Cl. ....................H04m 11/00

[58] Field of Search....................179/2 A, 5 R; 340/163, 171 A, 340/408

[56] References Cited

UNITED STATES PATENTS

| | | | |
|---|---|---|---|
| 3,400,378 | 9/1968 | Smith | 179/2 A |
| 3,307,147 | 2/1967 | Goldman | 179/2 DP |
| 3,383,467 | 5/1968 | New | 179/2 A |

*Primary Examiner*—Ralph D. Blakeslee

*Attorney*—Kenyon & Kenyon Reilly Carr & Chapin

[57] ABSTRACT

Machinery or other apparatus at a remote location is monitored and/or controlled by means of coded tone signals in the audio range transmitted between a master control station and one or more remote stations through the medium of conventional telephone lines. Both the master and the remote stations have transmitting equipment including an encoder and receiving equipment including a decoder which are operated in a sequence depending upon whether a control, monitoring or automatic reporting operation is taking place. The code employed is a four out of 16 tone system which gives 256 possible tone combinations and hence, 256 discrete pieces of information which can be conveyed between the master and control stations. For example, one such tone combination might be used to identify the remote station, while other tone combinations could be used to convey control commands from the master to a remote station and to report on the conditions of the monitored apparatus at the remote station to the master station.

14 Claims, 10 Drawing Figures

INVENTORS
EDWARD J. CUSHMAN
BY JASPER CLARK
Kenyon & Kenyon Reilly Carr & Chapin
ATTORNEYS INVENTORS
EDWARD J. CUSHMAN
JASPER CLARK
BY
Kenyon & Kenyon Reilly Carr & Chapin
ATTORNEYS INVENTORS
EDWARD J. CUSHMAN
JASPER CLARK
BY Kenyon & Kenyon Reilly Carr & Chapin
ATTORNEYS Patented March 7, 1972

3,647,971

6 Sheets-Sheet 4

INVENTORS

BY EDWARD J. CUSHMAN
JASPER CLARK

Kenyon & Kenyon Reilly Carr & Chapin

ATTORNEYS

INVENTORS
EDWARD J. CUSHMAN
JASPER CLARK
BY Kenyon & Kenyon
Reilly Carr & Chapin
ATTORNEYS INVENTORS
EDWARD J. CUSHMAN
JASPER CLARK
BY
Kenyon & Kenyon Reilly Carr & Chapin
ATTORNEY

AUTOMATIC REPORTING MONITORING AND CONTROL SYSTEM

BACKGROUND OF THE INVENTION

This invention relates to the monitoring and/or control of machinery or other apparatus at a remote location by means of coded tone signals in the audio range which are transmitted between a master control station and one or more remote stations through the medium of conventional telephone lines. Various monitoring or control systems utilizing telephone lines have been proposed in the past. However, all of these systems have suffered from one or more disadvantages. Among these have been susceptibility to actuation by spurious signals and lack of flexibility, requiring either expensive duplication of equipment at each reporting station for each condition to be monitored or controlled, or else expensive conversion of existing equipment each time the condition to be monitored was to be changed.

BRIEF DESCRIPTION OF THE INVENTION

The present invention overcomes the above-stated deficiencies in the prior art by utilizing a unique tone code system wherein both the master control station and each of the remote stations contain both receiving and transmitting equipment including encoding and decoding apparatus. The code employed is a four out of sixteen tone system which provides 256 possible tone combinations and therefore 256 discrete pieces of information which can be transmitted between the master and remote stations. For example, one such tone combination could be used to identify the remote station while the others could be used to indicate whether pressure, temperature or other monitored conditions have exceeded or fallen below a predetermined level.

The system to which this invention is directed can operate in any of three basic modes—an automatic reporting mode, an inquiry or a control mode followed by a reporting mode.

In the automatic reporting mode, a call is initiated to the master control station by the actuation of a sensor at one of the monitored remote stations which indicates that one of the monitored conditions has deviated from its predetermined standard. The actuation of the sensor sets into operation an automatic dialer which is preset to dial only the telephone number of the master control. At the same time, a timing circuit is set into operation and if a recognition signal is not received within a predetermined time from the master control station indicating that the call has been correctly completed, the call will be terminated and the automatic dialer will redial the master control until the proper recognition signal is received. After the recognition signal has been received and decoded at the remote station, the decoded signal is applied to a switching device which initiates operation of an automatic scanner. The scanner interrogates all sensors associated with conditions to be monitored, after first initiating the transmission of a coded signal to the master control station identifying the location of the remote station. The abnormal condition initiating the call will, of course, be reported to the master station as a combination of four tones as well as any other conditions which deviate from their predetermined standards. When a complete scanning cycle has been completed, the call will be automatically terminated.

The master control station is provided with decoding means for converting the signals transmitted by the remote station into voltages which actuate indicating means providing a readout of the information received from the remote station. The indicating means, which may take the form of a matrix of lamps for example, will remain actuated until the abnormal condition at the remote station has been corrected and by the same token, the sensor corresponding to that condition at the remote station will remain actuated until the condition has been corrected. The sensor will be unable however to initiate another call once the initial call has been completed, but the closure of another sensor will initiate another call.

In the inquiry mode of operation, the cycle is initiated by an operator at the master station placing a call to the remote station. The operator at the master control station then starts the cycle of operation described above in connection with the automatic reporting mode, by transmitting a coded command after the remote station has identified itself.

In the control mode of operation, control signals consisting of combinations of four tones as described above, are transmitted by the master control station after a call has been completed to the remote station. These coded signals are decoded at the remote station and are gated and applied to the machinery which is to be turned on or otherwise controlled.

OBJECTS OF THE INVENTION

In accordance with the above description, it is an object of this invention to provide an improved monitoring and control apparatus utilizing the telephone lines to transmit data.

It is a further object of this invention to provide an automatic monitoring and control apparatus using the telephone lines wherein safety is achieved from actuation by spurious signals through the use of a four-tone combinatorial code.

Another object of this invention is the transmission of data over telephone lines through a unique code in conjunction with new and improved encoding and decoding apparatus provided at both the master and remote stations for maximum flexibility in the use of the data transmission system.

BRIEF DESCRIPTION OF THE DRAWINGS

A complete understanding and full appreciation of these and other objects and features of this invention may be had from a consideration of the following detailed description and the drawing in which:

FIG. 8 is a schematic diagram of a call termination circuit at the master control station;

DETAILED DESCRIPTION

Figure 1:
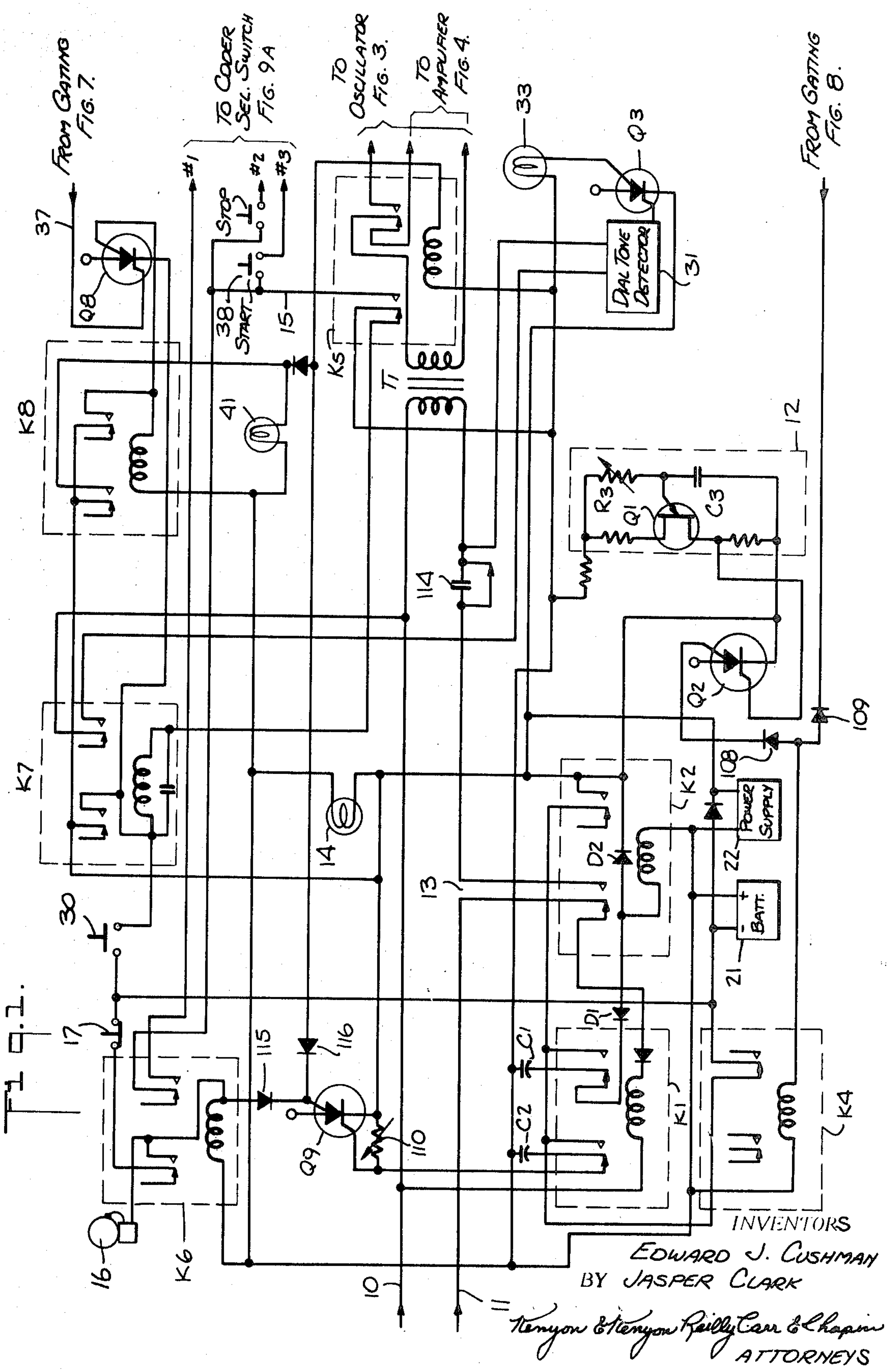
FIG. 1 is a schematic diagram of the switching network and some of the associated circuitry found at the master control station.

Referring now to FIG. 1, the switching circuitry at the master station will be described first with reference to the automatic reporting mode, i.e., the mode wherein a call to the master station is automatically initiated by the occurrence of an abnormal condition at one of the remote stations. In the discussion which follows, each relay is given a reference character preceded by the letter K and its associated coil and contacts are depicted within a rectangular enclosure delineated by dashed lines. The contacts of each relay are depicted in conventional notation as either normally closed or normally open.

Automatic Reporting Mode

When a call is received by the master unit, a 110 volt alternating current ringing signal appears across telephone lines 10 and 11 in FIG. 1, and activates relay K1 which is across the telephone lines. The closing of the normally open contacts of relay K1 causes B+ to be connected to capacitors C1 and C2 and these capacitors charge for so long as relay K1 is activated, approximately 1½ seconds, the average length of the ringing signal. When the ringing signal terminates, capacitor C1 discharges through diode D1, energizing relay K2. A normally open contact controlled by the winding of relay K2 then closes and applies ground to the coil, latching relay K2 in the energized condition.

The same set of contacts applies ground to timing circuit 12 which consists of unijunction transistor Q1, capacitor C3 and Variable resistor R3. Since B+ is already applied to resistor R3, capacitor C3 starts charging. The time constant determined by R3 and C3 determines how long it takes for capacitor C3 to charge to the value at which unijunction transistor Q1 conducts. When Q1 conducts it in turn renders silicon controlled switch (SCS) Q2 conductive and ground is applied to the other side of the coil of relay K4. Relay K4 will then become energized and its normally closed contact which has ground applied to it will open. The opening of the normally closed contacts of relay K4 removes ground from relay K2 and that relay is no longer latched in the energized condition. The deenergization of relay K2 causes the short circuit which had been placed across open circuit 13 to be removed and the equipment is once again taken off the telephone lines.

The above sequence of operation of the timing circuit 12 and relay K4 ensures that the receiving equipment is taken off the line automatically after a predetermined time. This protects against the equipment's being tied up indefinitely by a call to the master station from a spurious source. Of course, the sequence of reporting by the remote stations must then take place within the time limit imposed by the timing circuit 12.

The following sequence of operations takes place within the time limit prescribed by timing circuit 12. When relay K2 is initially energized through the discharge of capacitor C1 through its coil, as described above, the closing of its normally open contacts and opening of its normally closed contacts perform the following functions:

1. Ground is applied to one side of busy light 14 causing the light to be activated, thus providing an indication to anyone who is present at the master control station that the lines are in use;
2. Ground is provided to timing circuit 12, as described above;
3. Line matching transformer T1 is switched on to the line by the shorting of open circuit 13 as described above; and
4. By closing a set of normally open contacts, the coil of relay K1 is taken off the line and therefore no further incoming calls can activate the circuitry during the time period imposed by timing circuit 12 or for so long as relay K2 remains in the latched condition.

At the same time that relay K2 is energized the discharge of capacitor C2 through variable resistor 110 will cause SCS Q9 to conduct and connect one side of the coil of relay K5 to ground through diode 116. This will cause relay K5 to become energized since the other side of its coil has B+ applied to it continuously. Ground is also applied to the coil of relay K6 through diode 115, causing it to become energized. Q9 will only conduct for the useful discharge time of capacitor C2, which in a preferred embodiment is approximately 1 second.

The energization of relay K6 causes its normally open contact to close, activating alarm 16. Relay K6 becomes latched in the energized position by the application of ground to its coil through its now closed contact and the only way the relay can become deenergized is by an operator at the master station manually pressing cancel button 17. Alarm 16 can, of course, take any form according to the requirements of the particular application to which the system is put, but in the embodiment illustrated provides an audible indication that an abnormal condition has occurred at one of the remote stations being monitored.

When relay K5 is energized by SCS Q9, as described above, the closing of its normally open contacts serves to switch the secondary of transformer T1 from the amplifier to the oscillator position. Relay K5 is designed so that its contacts are switched for approximately one second and then revert to their initial position. When the secondary of transformer T1 is switched to the oscillator position a four-tone recognition signal will be transmitted to the remote station which has called, identifying the master control station. After one second has elapsed the contacts of relay K5 revert to their initial position and the secondary of transformer T1 is once again in the amplifier position where it is ready to receive the transmission of data from the remote station.

The remainder of the circuitry of the master control station shown in FIG. 1 will be described in connection with the inquiry and control modes of operation. However at this point, the operation of the switching circuitry at the remote station will be described in connection with the automatic reporting mode of operation.

Figure 2:
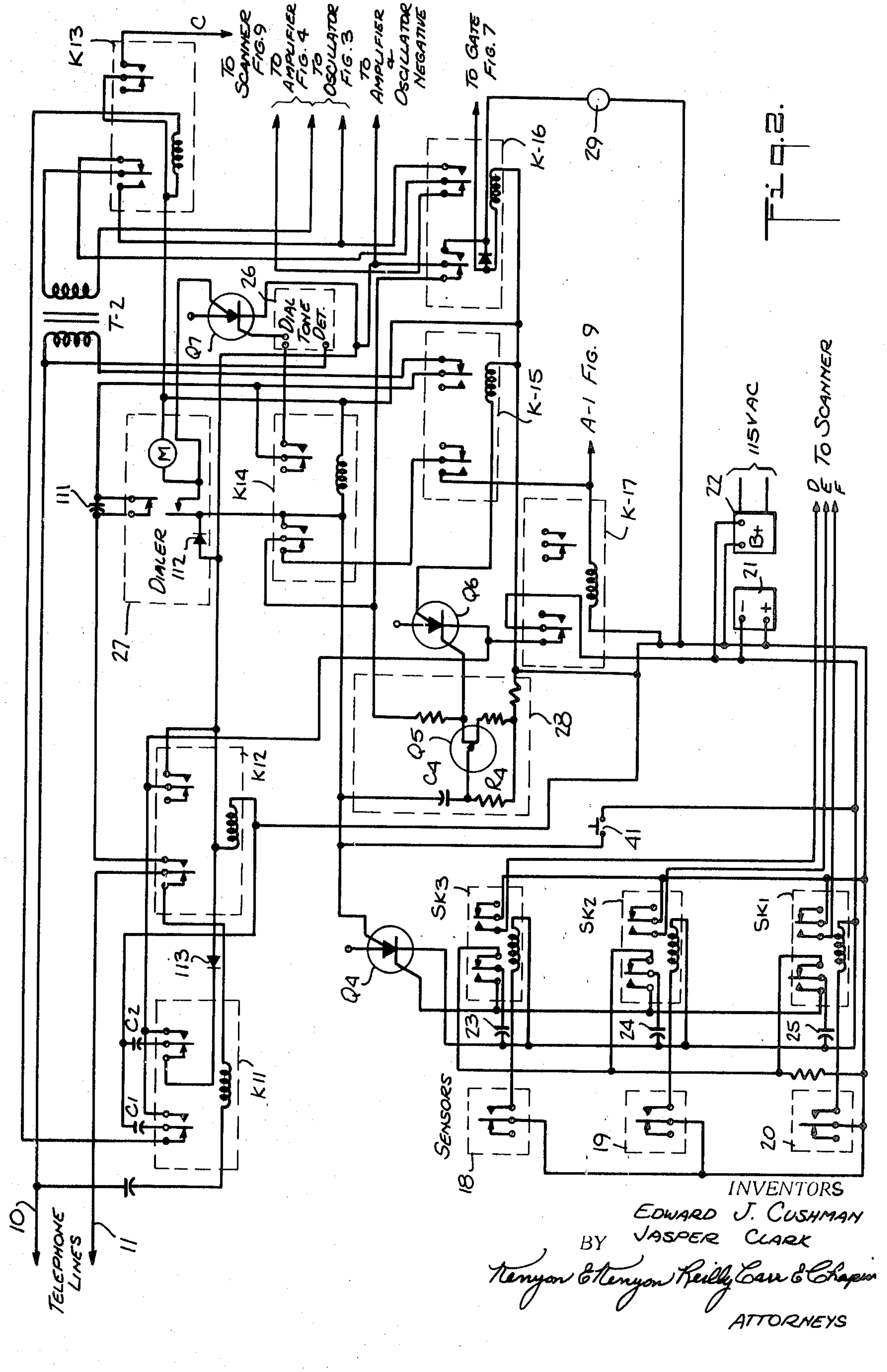
FIG. 2 is a schematic diagram of the switching network and some of the associated circuitry found at each of the remote stations.

The switching circuitry at the remote station depicted in FIG. 2 is substantially the same as that at the master control station discussed above in connection with FIG. 1. The essential differences are that the circuitry at the remote station contains an automatic dialer, a scanner and sensors for sensing abnormal monitored conditions.

The power source for the switching circuitry at the remote station shown in FIG. 2 may typically be a 12-volt DC B+ supply 22 operating from a 115 volt AC line. The power supply 22 is connected in parallel with battery 21 which it is in effect continually charging and provides a source of emergency power to the remote unit in the event of a power failure. The same power source is utilized at the master control station.

As stated previously, the system using a four out of 16 tone code is capable of conveying 256 pieces of information. Since one of these combinations is used as the identifying code of the remote station and another is used to terminate the call, the theoretical capacity of a single remote unit is 254 conditions which can be monitored. Of course, in a practical embodiment some number less than the theoretical maximum would be employed and for the sake of simplicity only three monitored conditions are illustrated in the system depicted in FIG. 2.

Each of sensors 18, 19 and 20 is associated with a different condition to be monitored and/or controlled. For example in a piece of air conditioning equipment sensor 18 might be responsive to a predetermined temperature level, sensor 19 might be responsive to a predetermined pressure level and sensor 20 might be responsive to a predetermined volume of fluid.

Each of sensors 18, 19 and 20 has associated with it a relay and relay contact, designated respectively SK3, SK2 and SK1. The closing of a sensor, such as 20 for example, applies B+ to its normally open contact and energizes its associated relay, SK1. Each of the sensors 18, 19 and 20 has associated with it a capacitor, 23, 24 and 25 respectively, which is normally charged to B+. When sensor 20 closes, capacitor 25, through the energization of relay SK1 will momentarily place B+ on the cathode gate of silicon controlled switch Q4. This will cause Q4 to conduct and to place ground, which is normally applied to its cathode, to one side of the coil of relay K14 through its anode gate. The coil of relay K14 has B+ applied at all times to the other side of its coil so that the application of ground will cause the energization of that relay. At the same time ground is applied through diode 112 to relay K12, energizing that relay.

When relay K14 becomes energized, the closure of its normally open contacts latches it in the energized position through the contacts of relay K12 and switches dial tone detector 26 onto telephone lines 10 and 11.

Dial tone detector 26 is a standard tuned filter network which is tuned to the frequency of the normal dial tone. If a dial tone is on the line, the output of dial tone detector 26 will provide an actuating pulse of approximately 1 volt DC to the cathode gate of silicon controlled switch Q7. Q7 will conduct and apply ground to the motor M of automatic dialer 27, causing the dialer to dial the preselected number of the master control unit through its dialing contacts 111, and 111A. Contact 111A connects dialer motor M to ground, once the dial tone terminates. Diode 112 isolates the dialer from the other circuitry. The automatic dialer may be of any type known in the art. One dialer which would be suited for the purposes of the present system is shown in FIG. 1 of U.S. Pat. No. 3,427,401, issued to R.E.Waddell on Feb. 11, 1969.

As stated above, the energization of relay K14 applies ground to the coil of relay K12. This causes relay K12 to become energized, since it normally has B+ applied to the other side of its coil. The closing of one set of normally open contacts of relay K12 latches the relay in, while the closing of the other set of normally open contacts switches ring detector relay K11 off the telephone line, switches transformer T2 onto the telephone line and applies ground to timing circuit 28.

Timing circuit 28 is identical in all essential respects to timing circuit 12 described above in connection with FIG. 1. The purpose of the timing circuit 28 in the remote station circuitry of FIG. 2 is to terminate the call if a recognition signal is not received from the master control station within the time period determined by the time constant of resistor R4 and capacitor C4. If a recognition signal from the master station is not received within the predetermined time period, the conduction of unijunction transistor Q5 will cause silicon controlled switch Q6 to conduct and apply ground to the coil of relay K15 through its anode gate. The other side of relay K15 has B+ applied to it continuously, so that the application of ground will cause the relay to become activated.

The opening of one set of normally closed contacts of relay K15 will cause the open circuiting of telephone line 11, which is in effect a momentary hangup. Relay K14 however, is still energized, so that the aforedescribed sequence of operation of timing circuit 28 will be repeated with capacitor C4 charging to B+ through the circuit supplied by the closure of relay K14's contacts. In addition, dial tone detector 26 is still across the telephone lines due to the energization of relay K14 and therefore upon the receipt of a dial tone automatic dialer 27 will again dial the master station. This cycle will be repeated until a recognition signal is received from the master station.

The generation of a recognition signal by the master station was described above in connection with FIG. 1 and involved the momentary switching, for approximately 1 second, of the secondary of transformer T1 from the amplifier to the oscillator position.

When the recognition signal is received from the master control station, transformer T2 passes the signal which consists of a combination of four tones as described above, through an amplifier and into a tone-dividing network and from there to the gating circuits and decoding circuitry which will be described in detail hereinbelow. At the present time it is sufficient to understand that if the recognition signal is valid, the decoding network will apply ground to the coil of relay K16. Relay K16 will then energize, since it continuously has B+ applied to the other side of its coil and the closure of its normally open contacts and opening of its normally closed contacts will cause the following to happen:

1. Relay K16 will be latched in the energized condition;
2. The latch of relay K14 will be broken and relay K14 deenergized;
3. The secondary of transformer T2 will be switched from the amplifier to the oscillator position;
4. The motor 29 of the scanner (which will be discussed in more detail hereinbelow) is started; and
5. Through the deenergization of relay K14 timing circuit 28 is open circuited and the operating cycle of the timing circuit 28 and silicon controlled switch Q6 as described above, ceases.

The scanner, which will be described in more detail hereinbelow in connection with FIGS. 9 and 9A, consists basically of a pair of ganged rotary switches, each having twelve positions thereon, driven by a shaft of motor 29. The rotary switches are connected through a diode matrix to sixteen output positions corresponding to each of the 16 possible tones. As the rotary switch is driven by motor 29 it samples each of the leads of the SK's in FIG. 2 such as leads D, E, and F connected respectively to SK3, SK2 and SK1. When a sensor closure has occurred B+ will be passed through the diode matrix to four of the 16 output leads corresponding to the four-tone combination designating that particular abnormal condition indicated by the sensor closure. One position of the rotary switch will also be utilized to send a four-tone combination identifying the location of the remote station calling and the last position will be utilized to send a four-tone combination to terminate the call.

As described above, in connection with the master control unit illustrated in FIG. 1, transformer T1 is in the amplifier position during the transmission of the combination of four tones identifying the remote station which has called and each of the combinations of four tones identifying the particular sensor closures. These four-tone combinations will be detected and decoded and displayed in accordance with the circuitry illustrated in FIGS. 4, 6 and 7, discussed hereinbelow.

Inquiry and Control Modes of Operation

The inquiry and control modes of operation involve basically the same series of steps described above in connection with the master control apparatus of FIG. 1 and the remote station apparatus of FIG. 2, except that the automatic dialer of the remote station is not used and all calls are initiated manually at the master control station. Referring again to FIG. 1, an attendant at the master control station, in order to inquire as to the status of the remote station or to transmit control orders must first ascertain that busy light 14 is off. This means that no signal is being received from a remote station. The operator then depresses send switch 30. The closure of send switch 30 energizes send light 41 and applies ground to relay K7 which energizes. The energization of relay K7 will apply ground to the coil of relay K2, causing that relay to energize and latching relay K7 in the energized condition through the now closed contacts of relay K2. In this case, unlike the automatic reporting mode, capacitors C1 and C2 do not charge, due to the blocking action of diode D1. It will be remembered that the energization of relay K2 activates time delay circuit 12, latches relay K2 in the energized condition, energizes busy light 14 and places transformer T1 on the telephone line.

The energization of relay K7, by the closure of its normally open contacts, applies ground to the cathode of SCS Q8 and connects dial tone detector 31 to the telephone lines 10 and 11. Dial tone detector 31 in FIG. 1 is precisely the same and operates in the same way as dial tone detector 26 in FIG. 2.

When a dial tone is received, dial tone detector 31 triggers silicon controlled switch Q3 which applies ground to dial light 33. Since dial light 33 has had B+ applied to its other side by the energization of relay K2 it becomes energized. The operator at the master control station is thus able to ascertain that a dial tone is present by the lighting of dial light 33. At that time he will hand dial the telephone number of a given remote station. The instrument necessary to dial the remote station is not illustrated but is entirely conventional. Dialer contacts 114 are shown schematically.

Referring now to FIG. 2, the dialing of the number of the remote station by the operator at the master control station causes a ringing current to appear across telephone lines 10 and 11 at the remote station. Relay K11 and associated capacitors C1 and C2 comprise a ring detector which operates in precisely the same manner as relay K1 and capacitors C1 and C2 in FIG. 1 described above in connection with the automatic reporting mode of operation. The discharge of capacitor C1 through the coil of relay K12 energizes that relay, which latches itself in and takes the ring detector, relay K11, off the telephone lines. The closing of its normally open set of contacts puts transformer T2 on the telephone lines and activates timing circuit 28 through the normally closed contacts of relay K16. In this instance, unlike the automatic reporting mode, relay K14 is not energized since a sensor closure did not connect ground to one side of its coil as described above. Therefore, dial tone detector 26 is not connected to the telephone lines as it would be in the automatic reporting mode of operation described above and the automatic dialer 27 is not activated.

The cessation of the ringing signal across telephone lines 10 and 11 will deenergize relay K11 and cause capacitor C2 to discharge through the coil of relay K13, energizing that relay. The energization of relay K13 transfers the secondary of transformer T2 from the amplifier to the oscillator position and applies B+ to the first position of the scanner through lead "C," which as described above, caused the combination of four tones identifying the location of the particular remote station to be transmitted over the telephone lines to the master control station. Relay K13 deenergizes after capacitor C2 has completely discharged and the secondary of transformer T2 is switched back to the amplifier position from the oscillator position. The unit is now ready to receive the instruction tones from the master control station. These instruction tones may either start, or stop the equipment at the remote station or command the remote station to go into the transmit mode whereby the condition of all sensors is sampled by the scanner.

At the master control station, the four-tone combination signal identifying the location of the remote station is decoded by the decoding network to be described hereinafter with respect to FIGS. 4 and 6 and causes ground to be applied to one side of remote station identification light 34 illustrated in FIG. 7. Of course, a greater number of location lights could be provided at the master control station depending upon the number of remote stations to be monitored. Assuming for the moment, that the remote location corresponding to light 34 was dialed by the attendant at the master control station, light 34 will be lit by the application of ground to one side thereof since B+ is continuously applied to its other side. The energization of location light 34 indicates to the operator at the master control station that the call to the remote station has been successfully completed.

Figures 4, 7:
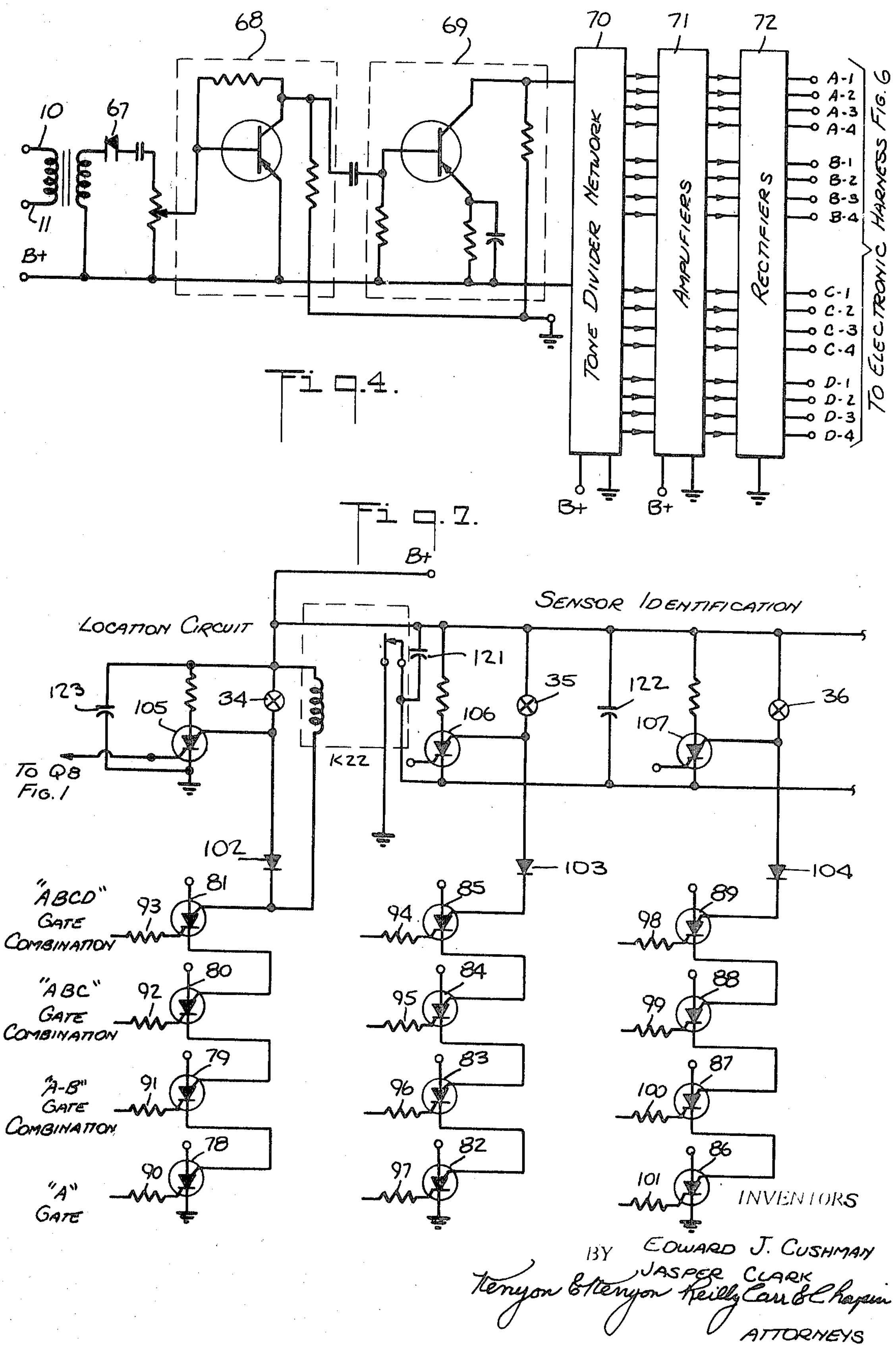
FIG. 7 is a schematic diagram of the gating circuitry utilized with the harness of FIG. 6.

At the same time that ground is applied to location light 34, it is also applied to one side of the coil of relay K22 in FIG. 7. This causes the relay to become energized since B+ is applied to the other side of its coil and the opening of its normally closed contacts causes ground to be removed from sensor identification lamps 35 and 36.

Thus, if either of the sensor identification lamps 35 or 36 had been energized from a previous call, it will become deenergized. It should be realized that only two sensor identification lamps are illustrated in FIG. 7 but that up to 252 more could theoretically be employed.

At the same time that ground is applied to one side of the coil of relay K22, it is also applied to the anode gate of SCS 105 causing it to conduct and transfer a positive voltage through its cathode gate to lead 37 in FIG. 1. This will cause SCS Q8 to conduct and apply ground to one side of coil of relay K8, through its anode gate. It will be remembered that ground had been previously applied to the cathode of Q8 by the energization of relay K7 and the closing of its normally open contacts. Relay K8 will now become energized since B+ is continuously applied to the other side of its coil.

The energization of relay K8, causes the relay to latch itself in the energized position and apply ground to send light 41, causing that light to be energized and indicating that the apparatus is in condition for transmitting commands to the remote station. The same contact of relay K8 also applies ground to one side of the coil of relay K5 causing that relay to be energized. One set of normally open contacts of relay K5 will now apply B+ through lead 15 to one side of start switch 38 and stop switch 39. At the same time as described above, the other set of contacts of relay K5 will cause the secondary of transformer T1 to be switched from the amplifier position to the oscillator position.

Since the energization of send light 41 and the energization of relay K5 occur substantially simultaneously, as soon as the operator observes that light 41 is lit he will press either start button or stop button 39 depending upon the command which he wishes to send to the remote station. If, for example, start button 38 is depressed, B+ will be fed along lead 3 to the coder selector switch which will be discussed in more detail hereinbelow in connection with FIG. 9A. The selector switch is programmed so as to apply B+ to the correct four sections of the oscillator, illustrated in FIG. 3, for generating the preselected four-tone start command. Since the secondary of transformer T1 is in the oscillator position, this four-tone command will be passed along telephone lines 10 and 11 to the remote station which was previously dialed by the operator. That combination of tones will be decoded by the circuitry to be described hereinafter below, and applied to the appropriate actuating control on the machinery at the remote station which is to be started. Similarly, depressing stop button 39 will cause a stop command to be transmitted to the remote station and the machinery which is controlled will thereupon stop after the command combination of tones has been decoded.

It should be realized that the start command could also be programmed to apply ground to the coil of relay K16 in FIG. 2 through the lead labeled "to gate FIG. 7." In this case, the machinery at the remote station would be started and the scanner would go through its entire cycle of sampling each of the sensors. Since as described above in connection with the automatic reporting mode relay K5 is designed so that its contacts operate only momentarily, the secondary of transformer T1 will automatically switch back to the amplifier position after the start command has been transmitted. Therefore, the apparatus at the master control station will be in condition to receive the coded information concerning the condition of the monitored apparatus at the remote station and to transmit that information through the amplifier of FIG. 4 and from there to the decoding and display circuitry which will be described in detail hereinbelow. Of course, a separate receive button, like start button 38 and stop button 39, could be employed to initiate the operation of the scanner at the remote station. However, in the preferred embodiment of the invention the receive command is initiated by the first position of the selector switch (FIG. 9A), which is connected to line 1 in FIG. 1.

From the time the operator at the master control station closes start switch 30, time delay circuit 12 is in operation. Therefore, the start, stop or receive button must be closed and the desired commands transmitted before the expiration of the predetermined time period after which time delay circuit 12 causes the apparatus to be taken off the telephone lines.

As mentioned hereinabove, wherever a sensor closure indicates that an abnormal condition has occurred, the sensor relay SK1, SK2, or SK3 in FIG. 2 will remain in its energized condition until the abnormal condition has been alleviated. By the same token, the indicator light at the master control station corresponding to that abnormal condition at a particular remote station will remain lit. In order to signal correction of the problem, a manually operated push button 41 is located at the remote station (FIG. 2). The serviceman, after having corrected the problem, may depress push button 41 in order to activate relay K14. This will cause automatic dialer 27 to dial the master control station and the complete scanning operation will take place as described above. This will then indicate to the master control station that the previous abnormal condition no longer exists since the indicator light corresponding to that condition will not be actuated as a result of the scanning operation.

Scanner and Encoder Circuitry

Figures 9, 9A:
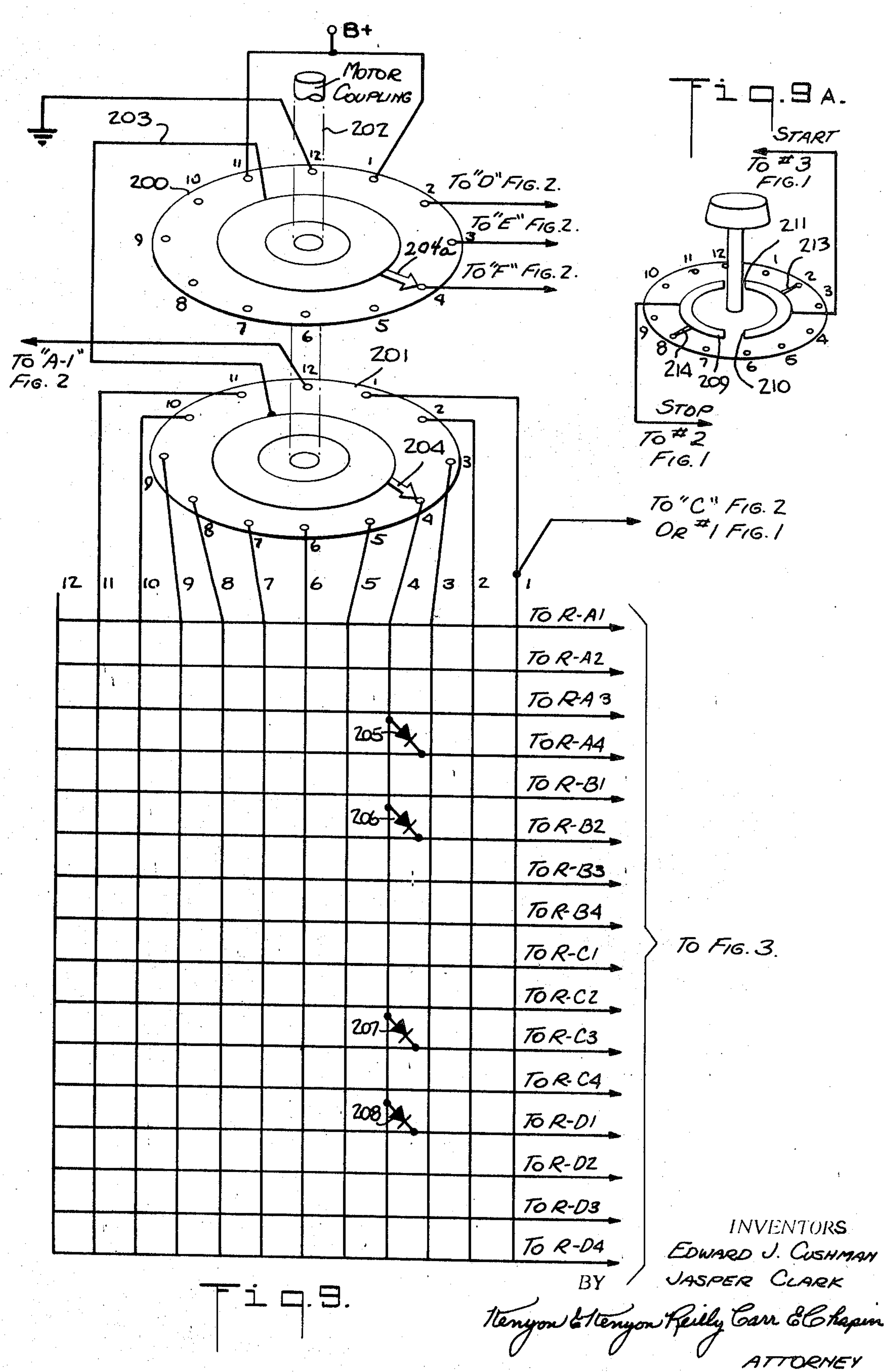
FIG. 9 is a diagram partly schematic and partly in perspective showing the essential features of the scanner at the remote station.
FIG. 9A is a diagram showing the selector switch at the master control station insofar as its features differ from the scanner at the remote stations.

Referring now to FIG. 9 there is illustrated the scanner in combination with the encoding circuitry which is found at each of the remote stations. Motor shaft 202 is driven by motor 29 in FIG. 2 and drives contact arms 204A and 204 of 12-position ganged rotary switches 200 and 201. Line 203 interconnects the common bus of the two ganged rotary switches so that whatever voltage is applied to contact 204A, the same voltage will be applied to contact 204. The encoder circuitry consists of a diode matrix, of which only four diodes, 205, 206, 207 and 208 are illustrated in the interests of simplicity.

In the particular example given above, assuming a closure of sensor 20 in Fig. 2, it will be remembered that B+ appears on line F. As illustrated in FIG. 9, when contact 204A is driven to contact position 4, it contacts line F and B+ is applied to line 4 of the diode matrix. Diodes 205, 206, 207 and 208 provide interconnections between line 4 and output lines RA4, RB2, RC3 and RD1. This will cause B+ voltage to be applied to the resistors in the oscillator section illustrated in FIG. 3 and discussed hereinbelow, so as to generate four tones corresponding to A4, B2, C3 and D1. This code will then be transmitted to the master control station indicating that a closure of sensor 20 has taken place. In a similar manner four diodes placed at different positions in the matrix would cause a different combination of four tones to be transmitted when B+ is applied to line E indication a closure of sensor 19 or on line D indicating a closure of sensor 18.

When contact arms 204 and 204A reach position 11 B+ which is continuously applied to position 11 in rotary switch 200, will be applied through line 11 and four appropriately placed diodes in the diode matrix to cause the four-tone combination to be transmitted which causes the master station to hang up or terminate the call. The manner in which this is accomplished at the master station will be discussed in more detail hereinbelow in connection with FIG. 8. When contact arms 204 and 204A reach position 12 of the rotary switches, ground will be applied directly to lead A–1 in FIG. 2. This will energize relay K17 and take battery 21 out of the circuit by the opening of the normally closed contacts of relay K17. All other relays will then revert to their initial positions and the apparatus at the remote station will once again be in condition to initiate another cycle. It should be noted that relay K17 is designed so that it energizes only momentarily and then reverts to its unenergized position.

Line 1 in the diode matrix may have B+ applied to it from line C in FIG. 2 or line 1 in FIG. 1. At the remote station this serves the function of transmitting the remote station identification signal by applying B+ through four appropriately placed diodes (not illustrated) along line 1 to one each of the A,B,C, and D output lines. It will be remembered that in the automatic reporting mode, relay K13 does not energize. Therefore, B+ is applied directly to position 1 of rotary switch 200 to cause the transmission of the remote station identification signal in the automatic reporting mode. However, in the inquiry or control modes of operation when relay K13 does energize, B+ will be applied along line C in FIG. 2 to line 1 of the diode matrix. This will again cause the four-tone signal to be transmitted identifying the remote station.

Referring now to FIG. 9A, there is illustrated the selector switch which is utilized at the master control station to transmit the stop, start and receive commands. It will be understood that a diode matrix is utilized with the selector switch at the master control station in precisely the same manner as described in connection with the scanner at the remote station illustrated in FIG. 9. Line 1 of the diode matrix is connected to line 1 in FIG. 1. The diodes are placed in line 1 of the diode matrix at the master control station so as to cause the four-tone combination identifying the master control station to be transmitted whenever B+ appears on line 1 in FIG. 1. This occurs whenever SCS Q9 conducts, causing the energization of relays K6 and K5. Thus, the direct connection of line 1 in the diode matrix causes the transmission of the master station recognition signal to the remote station in the automatic reporting mode of operation.

The selector switch at the master control station comprises a manually controlled knob 212, a common bus 209 divided at points 210 and 211 and contact arms 213 and 214. A line runs from the left-hand bus segment to line 2 in FIG. 1 while a similar line runs from the right-hand bus segment to line 3 in FIG. 1. The selector switch has 12 contact positions which are connected to the diode matrix in precisely the same manner as shown with respect to the twelve contact positions of scanner switch 201 in FIG. 9. Any one of the four positions 2 through 5 may be utilized to transmit the start command while any one of the positions 7 through 11 may be utilized to transmit the stop command.

As described above in connection with the inquiry and control modes of operation with respect to FIG. 1, closing start button 38 will cause B+ to appear on line 3. This voltage will then be applied to the right-hand bus segment in FIG. 9A through contact arm 213 to whichever position is programmed to transmit the four-tone combination signifying the start command, through the diode matrix to the four output positions for generating the appropriate four-tone signal. Similarly, when stop button 39 is closed in FIG. 1 B+ will appear on line 2 and be applied to the left-hand bus segment of 209, enabling the operator to turn manual control knob 212 and contact arm 213 to the proper position for transmitting the stop command.

In order to send the receive command, manual control knob 212 is turned so that contact arm 213 is at position No. 1. The start button 38 is then closed which applies B+ to the right-hand bus section of the selector switch in FIG. 9A. This B+ voltage will then be applied along line 1 through the four appropriately placed diodes so that the master control station four-tone recognition signal is transmitted to the remote station. After the signal is received, decoded and gated, it is applied to one side of the coil of relay K16 in FIG. 2, switching the secondary of transformer T2 to the oscillator position and starting scanner motor 29. The scanner will then go through a complete cycle of operation as described above in connection with FIG. 9 and terminate the call when it reaches position 12.

Oscillator/Mixer Section

Figures 3, 4, 5:
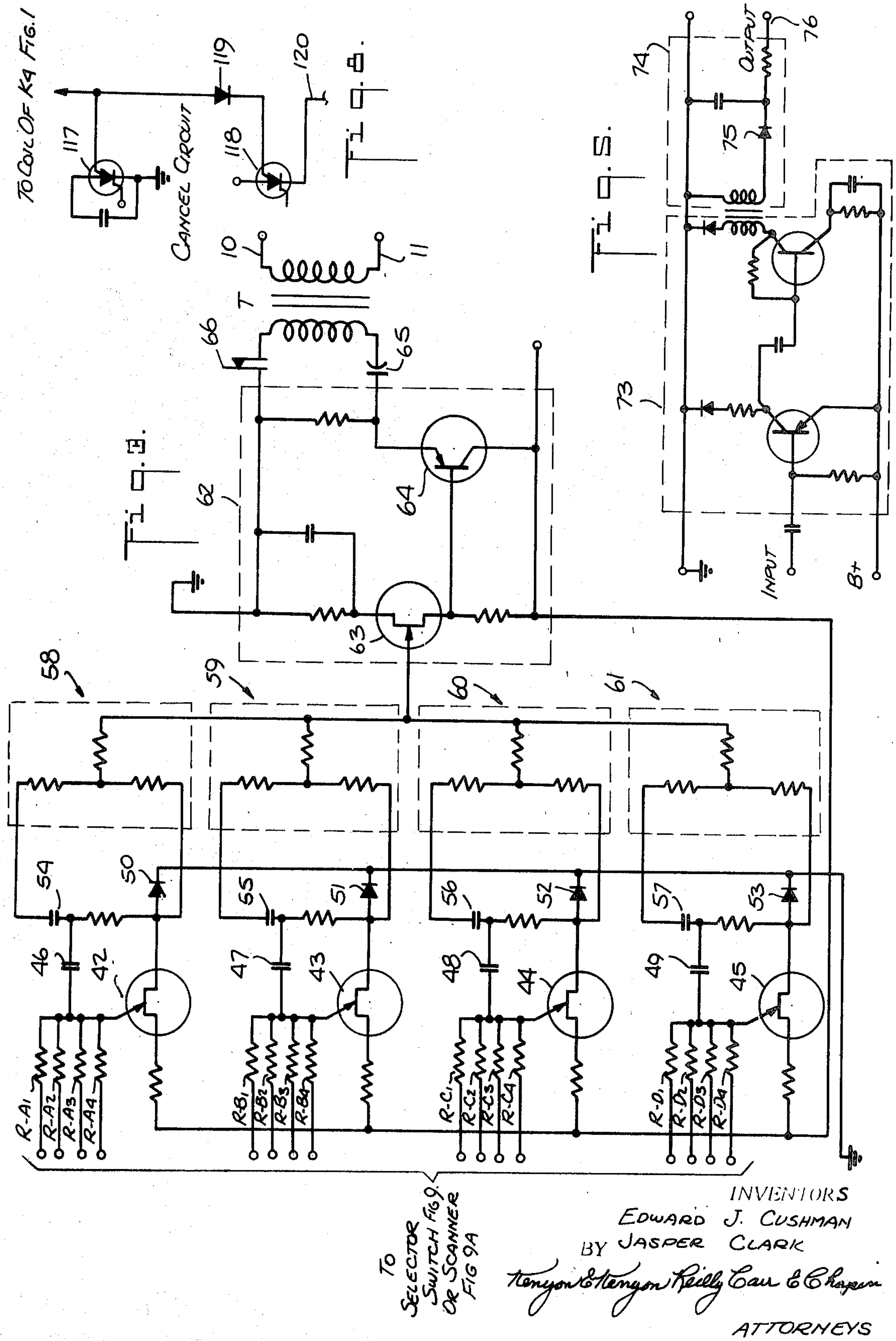
FIG. 3 illustrates the oscillator/mixer circuit for transmitting a combination of four out of 16 tones, found at both the master station and the remote stations.
FIG. 4 is a partly schematic and partly block diagram drawing of the receiving circuitry for separating coded tones into four discrete DC voltages.
FIG. 5 is a schematic diagram of the amplifier and rectifier section of the circuitry shown in FIG. 4.

Referring now to FIG. 3, there is illustrated the oscillator/mixer section which is identical at both the master control station and each remote station. The only difference in the apparatus is that at the master control station the combination of tones is selected by a selector switch (FIG. 9A), while at the remote station the combination of tones is determined through the medium of the automatic scanner (FIG. 9).

The oscillator section is comprised essentially of four RC oscillators, each having in association therewith four resistors. Depending upon the particular code chosen B+ will be applied to only one resistor for each of the four oscillators. Since each resistor will have a different value, each oscillator will be capable of producing four different tones depending upon which of its associated resistors has B+ applied thereto. With four oscillators, each capable of producing four tones, there will be sixteen different tones which can be produced by the oscillator section.

The four sections of the oscillator bank are designated by the letters "A," "B," "C," and "D" respectively. The A section consists of unijunction transistor 42, capacitor 46 and resistors R–A1, R–A2, R–A3, and R–A4; the B section, unijunction transistor 43, capacitor 47 and resistors R–B1, R–B2, R–B3 and R–B4; the C section, unijunction transistor 44, capacitor 48 and resistors R–C1, R–C2, R–C3 and R–C4; and the D section, unijunction transistor 45, capacitor 49 and resistors R–D1, R–D2, R–D3 and R–D4.

The outputs of the oscillator sections are coupled respectively through coupling capacitors 54, 55, 56 and 57 to balancing resistive networks 58, 59, 60 and 61, respectively. Blocking diodes 50, 51, 52 and 53 are provided to prevent unwanted feedback to the oscillators. The outputs of balancing networks 58, 59, 60 and 61 are combined in standard mixer circuit 62 which includes field effect transistor 63 and PNP-transistor 64. The output of the circuit is taken from the emitter lead of transistor 64 and applied through coupling capacitor 65 to transformer T.

Transformer T in FIG. 3 represents either transformer T1 in FIG. 1 or transformer T2 in FIG. 2. In the former case, relay contact 66 represents the normally open contact of relay K5 which has closed to switch the secondary of transformer T1 to the oscillator position. In the latter case, relay contact 66 represents a normally open contact of relay K13 which has closed to switch the secondary of transformer T2 from the FIG. 2) to the oscillator position. It should be remembered however, that the oscillator/mixer section is the same at both the master control and remote stations. amplifier To take the example discussed in connection with the automatic reporting mode, assume that sensor 20 at the remote station has closed indicating an abnormal condition and the abnormal condition is transmitted by tone combination A4, B2, C3, and D1. B+ will then be applied to resistors R–A4, R–B2, R–C3 and R–D1 in FIG. 3 by the scanner in a manner explained hereinabove. The output of transformer T (T2 in FIG. 2) applied to telephone lines 10 and 11 will therefore consist of the superposition of tones A4, B2, C3 and D1. This signal consisting of the above-stated four tones will then be received at the master control station and decoded by apparatus to be explained hereinbelow.

Amplifier, Tone Divider and Rectifier Section

Referring now to FIGS. 4 and 5, there are illustrated partially in schematic form and partially in block diagram form the circuits which receive the four-tone combination signal and separate it into four discrete DC voltages of approximately 1 volt each. These circuits are precisely the same at the master control station and the remote stations.

In FIG. 4 transformer T represents either transformer T1 in FIG. 1 or transformer T2 in FIG. 2. The input to the transformer is received along telephone lines 10 and 11 and consists of the four-tone combination signal. Contact 67 represents the normally closed contact of relay K5 in FIG. 1 which places the master control in the amplifier or receiver position or normally closed contact of relay K13 in FIG. 2 which similarly places the equipment at the remote station in the amplifier or receiver position. The four-tone combination signal is fed by the secondary of transformer T through preamplifier stage 68 comprising a single PNP transistor, and then into power amplifier stage 69 comprising a single PNP power transistor.

The output of power amplifier stage 69 is fed into tone divider network 70. Tone divider network 70 consists of 16 sharply tuned audio filters, each tuned to one of the 16 tones which the tone oscillator section (FIG. 3) is capable of producing. The outputs of the filters are separated by conventional means and separately fed to amplifiers 71, one amplifier being provided for each output of the tone divider network. The outputs of the amplifiers are in turn fed to rectifiers 72 and the outputs of the rectifier stage 72 will consist of four discrete DC voltages of approximately one volt. The 16 output leads of rectifiers 72 have been labeled A1 through A4, B1 through B4, C1 through C4 and D1 through D4 to correspond to the sixteen possible tones which the tone oscillator section (FIG. 3) is capable of producing.

In the particular example discussed above, where sensor 20 closes and places B+ on lead F in FIG. 2, it will be remembered that the four-tone combination, A4, B2, C3 and D1 was produced by the oscillator/mixer section in FIG. 3. Assuming that the circuitry in FIG. 4 is employed at the master control station, a positive DC voltage of approximately 1 volt will appear on each of leads A4, B2, C3 and D1 at the output of rectifier section 72.

FIG. 5 illustrates a typical amplifier and rectifier arrangement which might be utilized for each of the 16 amplifiers and rectifiers 71 and 72 respectively. Amplifier 73 is a conventional two-stage PNP transistor amplifier with transformer output and rectifier 74 is a conventional single wave rectifier utilizing diode 75 to produce a positive DC voltage output of approximately one volt at output terminal 76. It should be understood that the above-described circuitry would be repeated for each of the 16 possible tones and that output terminal 76 corresponds to any one of the terminals A1 through A4, B1 through B4, C1 through C4 and D1 through D4 in FIG. 4. Thus, in accordance with the particular example chosen, a positive DC voltage of approximately one volt will appear at terminals A4, B2, C3 and D1. These four discrete DC voltages will then be applied to terminal strip 77 in FIG. 6 and from there to the decoding and display circuitry.

Decoding and Display Circuitry

Figure 6:
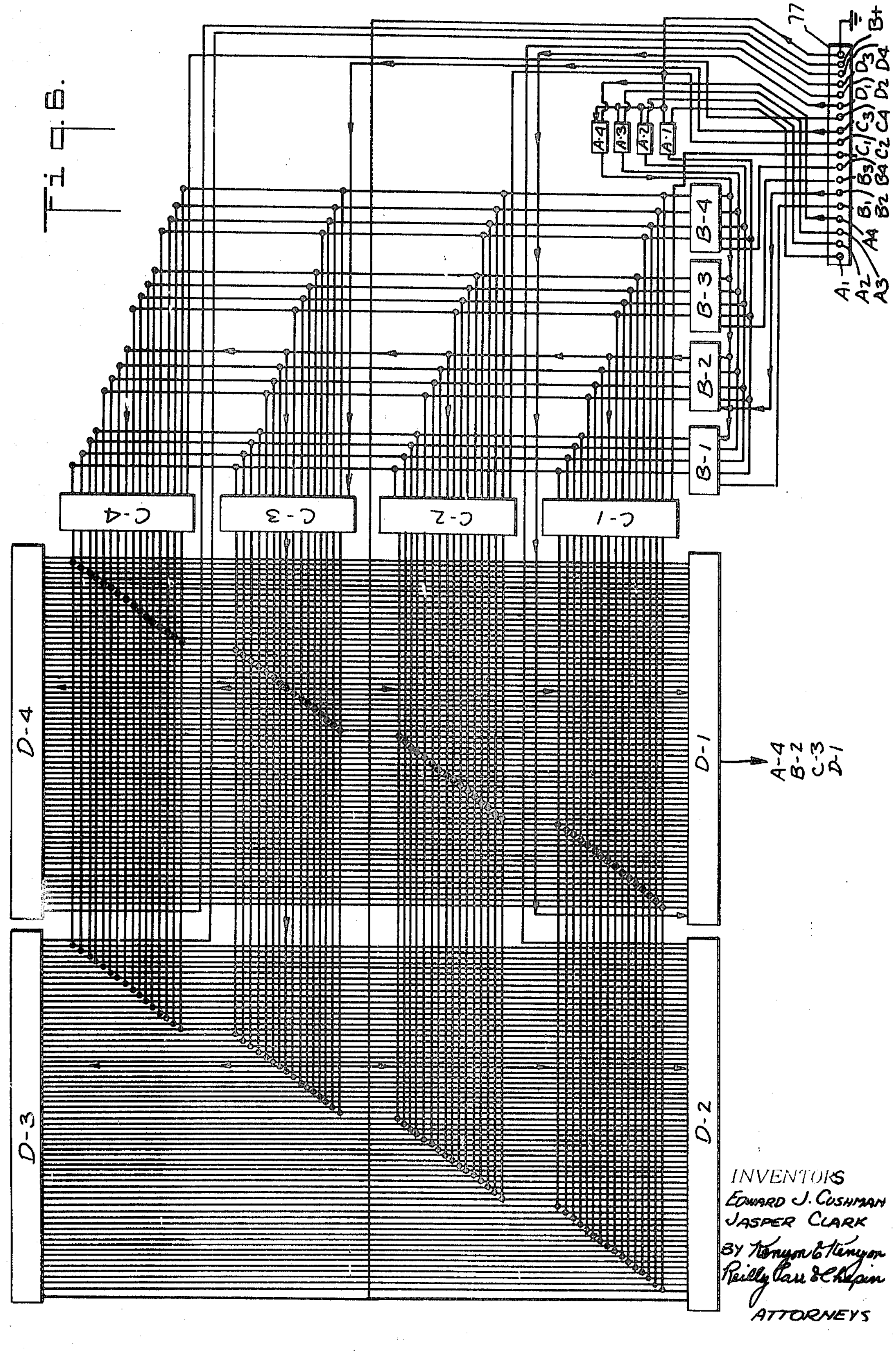
FIG. 6 depicts the decoding wiring network or "harness" as it is sometimes referred to herein.

Referring now to FIG. 6, there is depected the "electronic harness" or gating network for providing a single output indicative of the four-tone signal received on telephone lines 10 and 11 in FIG. 4. Terminal strip 77 has eighteen input terminals. Sixteen of these are connected to the output leads of rectifiers 72 in FIG. 4, corresponding to tones A1 through A4, B1 through B4, C1 through C4, and D1 through D4. The other two terminals are respectively grounded and connected to B+.

The rectangles bearing the designations A1 through A4, B1 through B4, C1 through C4 and D1 through D4 contain respectively the gating circuitry for providing a DC voltage output for each possible combination of tones. The output of each of the A gates is applied to each of the B gates and therefore the outputs of the B gates represent each B tone in combination with each of the A tones. Similarly, the outputs of the C gates represent each C tone in combination with each of the A and B combination tones and the outputs of the D gates represent each of the D tones in combination with each of the A, B, and C combination tones. Consequently, each B gate has four possible outputs, each C gate has sixteen possible outputs and each D gate has 64 possible outputs.

In the particular example discussed above, one volt DC inputs will be applied to terminals A4, B2, C3 and D1. The arrow at the output of gate A4 indicates that this is the only gate which received a DC voltage input. This output is then applied to each of the inputs of gates B1, B2, B3 and B4. The arrow at the output of gate B2 represents the combination of A4 and B2. This voltage is then applied to each of the gates C1, C2, C3 and C4. The arrow at the output of gate C3 then represents the combination of tones A4, B2 and C3. This voltage is then applied to each of the D gates, D1, D2, D3 and D4. The output of gate D1 then represents the unique combination of tones A4, B2, C3 and D1.

An example of gating circuitry which may be utilized in each of the A, B, C and D blocks in FIG. 6, as well as circuitry for effecting a display of the decoded information is illustrated in FIG. 7. The circuitry in FIG. 7 illustrates the gating means for decoding three specific combinations of tones and displaying the decoded information by means of a visual indicator. The first combination of gates comprises silicon controlled switches 78, 79, 80, and 81 and visual indicating means or lamp 34. The second combination of tones is decoded by silicon controlled switches 82, 83, 84 and 85 and displayed by lamp 35 while the third combination of tones is gated by silicon controlled switches 86, 87, 88 and 89 and displayed by lamp 36. The lowermost silicon controlled switches 78, 82 and 86 in each group represent the A group of gates, the second tier of silicon controlled switches 79, 83 and 87 represent the B group of gates, the third row of switches 80, 84 and 88 represent the C group of switches and the top row comprising SCS's 81, 85 and 89 represent the D group of gates.

While only three SCS's are shown for each of the A, B, C and D groups of gates, it should be realized that the A blocks in FIG. 6 will each contain one SCS, the B blocks will each contain four SCS's, the C blocks will each contain 16 SCS's and the D blocks will each contain 64 SCS's. In addition, it must be realized that the outputs from each lower group of gates are connected to each of the SCS inputs in each group of the next higher gates. Thus, for example, the output of gate A4 is connected to each of the inputs of the sixteen SCS's in the B group of gates, and so on. In the specific example illustrated in FIG. 7 the interconnections between only the four SCS's receiving a B+ input from the terminal strip are illustrated in each of the three groups.

In the example of FIG. 7, and as discussed hereinabove, lamp 34 represents the identification of the particular remote station calling, while lamps 35 and 36 represent particular abnormal conditions existing at the monitored remote station. In this particular case, lamp 35 represents the abnormal condition indicated by the closing of sensor 20 in FIG. 2 and represented by the combination of tones A4, B2, C3 and D1.

The 1-volt DC voltage applied to terminal strip 77 at point A4 in FIG. 6 will be applied to SCS 82 at its cathode gate through resistor 97. This will cause the switch to conduct and pass ground to the cathode of SCS 83. In the particular example given above, switch 83 would be located in the B2 block of gates and would have a 1-volt DC voltage applied to its cathode gate through resistor 96. The conduction of switch 83 will then pass ground to the cathode of SCS 84, representing the combination of A4 and B2. Switch 84, in the particular example given, would be in the C3 block of gates and would have a plus 1 volt DC voltage applied to its cathode gate through resistor 95 causing it to conduct. Ground will therefore be passed to the cathode of silicon controlled switch 85, representing the combination of A4, B2 and C3. In the particular example given, silicon controlled switch 81 would be in the D1 block of gates and would have a plus one volt DC voltage applied to its cathode gate through resistor 94 causing it to conduct. Of course, the above-described sequence takes place substantially simultaneously since all four voltages representing tones A4, B2, C3 and D1 are applied to terminal strip 77 in FIG. 6 at the same time.

The conduction of silicon controlled switch 85 will cause ground to be applied through diode 103 to one side of lamp 35 causing the lamp to become activated since the other side continuously has B+ applied to it.

SCS's 106 and 107 are provided for the purpose of latching lamps 35 and 36 respectively in the energized condition once ground has been applied through the gating circuitry. The cathode gates of SCS's 106 and 107 are unconnected and the cathodes are connected to ground through the normally closed contact of relay K22. When ground is applied to the anode gate of the SCS, this will cause it to conduct and keep ground continuously applied to one side of the lamps 35 or 36 until ground is removed from the cathodes of SCS's 106 and 107 by the energization of relay K22. Overload capacitors 121, 122 and 123 are provided to prevent premature energization of the lamps.

As described hereinabove, when ground is applied to remote station identification lamp 34 through its associated gating circuitry, relay K22 at the same time is energized causing its normally closed contact to open and deenergize any sensor identification lamps which had been previously energized. At the same time ground is passed to one side of the coil of relay K8 in FIG. 1, through the cathode gate of SCS 105. As explained above in connection with the inquiry and control modes of operation, the energization of relay K8 permits the control functions to be carried out by energizing relay K5 and send lamp 41.

As stated above, the same gating and harness circuitry is utilized at the remote station as at the master control station. However, in the case of the remote station, display lamps 34, 35 and 36 and the like would not be needed. Rather, in this case, the four-tone combination code transmitted by the oscillator apparatus at the master control station would be utilized to effect a control function. The output of a diode such as 103 in FIG. 7 would be used to turn on a start switch when the proper four-tone combination is received. This switch might be used to activate air conditioning machinery or the like whose operation would then be monitored by the master control station. One group of gates at the remote station, corresponding for example to SCS's 78, 79, 80 and 81 in FIG. 7, would be connected to an output diode such as 102 to the lead labeled "to gate FIG. 7." This gating combination would be arranged to apply ground to one side of scanner motor 29, starting the scanner, in response to the proper four-tone recognition signal received from the master control station.

One significant feature of the present invention is that the same 256 tone combinations can be utilized both for transmitting information from the remote station to the master control station and vice versa. This is made possible by the isolation between the amplifier and oscillator sections at both the master control and remote stations effectuated by the switching of relay K16 at the remote station and relay K5 at the master control station. It will be remembered that the energization of these relays causes the secondary of the line transformers T2 and T1 to be switched from the amplifier to the oscillator positions. Therefore, since the amplifier and oscillator sections are never connected to the line at the same time there can be no feed back from one section to the other.

Referring now to FIG. 8, there is illustrated a call termination or cancel circuit. As stated above, the next to last position of the scanner is programmed to apply B+ to the oscillator section of FIG. 3 so as to generate a four-tone signal for terminating the call. Lead 120 in FIG. 8 is connected to three other SCS's in addition to the one SCS 118 illustrated. When the four-tone termination of call signal is received at the master control station it will be decoded by a process identical to that described above in connection with FIGS. 6 and 7 and will apply ground through diode 119 to the coil of relay K4 in FIG. 1. SCS 117 does not cause the cancel circuit to become latched in since the anode is not connected to B+. Its energization will therefore be only momentary and it will serve to insure that ground is applied to the coil of relay K4 in FIG. 1 during its conduction period.

The energization of relay K4 in FIG. 1 will cause its normally closed contacts to open and disconnect B' source 21 from the master control circuitry. This will cause relay K2, which had been latched in the energized condition, to become deenergized and all other relays will likewise revert to their deenergized conditions in readiness for another incoming call. Diodes 108 and 109 in FIG. 1 are provided to isolate the lead to FIG. 8 from the remainder of the circuitry.

CONCLUSION

It is believed that the construction and method of operation, as well as the advantages of our improved monitoring and/or control apparatus is apparent from the foregoing detailed description. It should be apparent that while we have shown and described the invention in a preferred embodiment, changes may be made without departing from the scope of the invention, as defined in the appended claims.

We claim:

1. A system for transmitting control and monitoring data between a master control station and one or more remote stations containing apparatus to be controlled and having at least one condition to be monitored, comprising:

a. switching means at a remote station operable in response to the occurrence of an abnormal condition in said apparatus;

b. means at said remote station responsive to said switching means for establishing contact between said remote station and said master control station;

c. means at the master control station for transmitting a coded signal to said remote station identifying said master control station when said contact has been established;

d. means at the remote station for decoding the signal transmitted by said master control station;

e. means at said remote station responsive to the decoded signal for transmitting coded data to said master control station identifying the remote station and all abnormal monitored conditions existing in said apparatus comprising a plurality of oscillators and means for selectively activating a predetermined number less than the total number of said oscillators to produce a plurality of tones corresponding to said predetermined number; and f. means at the master control station for receiving and decoding said coded data comprising:

1. detecting means for separating said coded message into a plurality of groups of discrete voltages, one group for each abnormal condition at said remote station;
2. gating means for providing a plurality of output signals each uniquely representing one abnormal condition at said remote station including a plurality of distinct groups of gates equal in number to the total number of tones which said plurality of oscillators can produce; and
3. means for applying said groups of discrete voltages to said gating means.

2. The system set forth in claim 1 wherein said data is transmitted between the master control station and said one or more remote stations via telephone lines.

3. A system as set forth in claim 1 wherein said means for transmitting coded data further include means for superimposing said plurality of tones so that said coded message consists of the superimposition of tones of said predetermined number.

4. A system as set forth in claim 1 wherein a different combination of tones of said predetermined number is transmitted for each abnormal monitored condition at said remote station and a still different combination of tones is transmitted to identify said remote station.

5. A system as set forth in claim 1 wherein said plurality of oscillators comprises a plurality of oscillator sections each capable of producing a plurality of tones and said coded message comprises a different tone from each oscillator section.

6. A system as set forth in claim 1 wherein said switching means comprises a plurality of sensors each adapted to switch in response to the occurrence of a different abnormal monitored condition.

7. A system as set forth in claim 1 wherein sixteen oscillators are provided and said predetermined number is equal to four.

8. A system as set forth in claim 1 wherein:

a. 16 oscillators are provided;

b. said predetermined number is equal to four; and c. the number of groups of gates is equal to 16.

9. A system as set forth in claim 2 wherein said means responsive to said switching means comprises automatic dialer means.

10. A system as set forth in claim 2, further including timing circuit means at said remote station for continually reactivating said automatic dialer at the end of a predetermined time period set by said timing circuit until said identifying signal from said master control station is received within said predetermined time period.

11. A system as set forth in claim 1 wherein said means for selectively actuating a predetermined number of oscillators comprises means for scanning all monitored conditions at said remote stations and matrix switching means having an input connected to said scanning means and an output connected to said oscillators.

12. A system as set forth in claim 1 wherein said master control station further includes means for transmitting coded signals to each of said remote stations for selectively controlling said apparatus and said remote stations contain means for decoding said coded control signals.

13. A monitoring and control system as set forth in claim 1, said system further including:

a. a plurality of sensors at said remote station each actuable in response to a different abnormal monitored condition in said apparatus;

b. means for scanning said sensors to ascertain whether an abnormal condition has occurred in said monitored apparatus;

c. means at said master control station for transmitting a coded signal to energize said scanning means;

d. means at said remote station for applying said coded energizing signal to said decoding means so as to decode said energizing signal; and e. means for applying said decoded energizing signal to said scanning means to energize said scanner.

14. A monitoring and control system as set forth in claim 13 further including:

a. means at said remote station energized by said scanning means for transmitting a coded termination signal to said master control station;

b. means at said master control station for decoding said termination signal; and c. means at said master control station responsive to said decoded termination signal for terminating said communications link.

* * * * *

UNITED STATES PATENT OFFICE
CERTIFICATE OF CORRECTION

Patent No. 3,647,971 Dated March 7, 1972

Inventor(s) Edward J. Cushman and Jasper Clark

It is certified that error appears in the above-identified patent and that said Letters Patent are hereby corrected as shown below:

Column 8, line 11, after "button" (first occurrence) insert -- 38 --.

Column 9, line 29, "indication" should be -- indicating --.

Column 11, line 16, "FIG. 2)" should be -- amplifier --.

Column 11, line 18, after "." delete -- amplifier --.

Column 14, line 41, "$B^1$" should be -- B+ --.

Column 16, lines 45-46, delete "said communications link" and insert -- contact between said master control and remote stations --.

Signed and sealed this 26th day of September 1972.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
☆ U.S. GOVERNMENT PRINTING OFFICE : 1969 O—366-334